United States Patent
Ono et al.

(10) Patent No.: US 8,331,522 B2
(45) Date of Patent: Dec. 11, 2012

(54) MAINTENANCE AND REPAIR DEVICE FOR STRUCTURE INSIDE NUCLEAR REACTOR

(75) Inventors: Yoshiaki Ono, Zushi (JP); Hidekazu Sasaki, Kawasaki (JP); Takuya Uehara, Yokohama (JP); Hiromi Kato, Yokohama (JP); Toshihiro Yasuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 12/305,009

(22) PCT Filed: Feb. 29, 2008

(86) PCT No.: PCT/JP2008/053613
§ 371 (c)(1),
(2), (4) Date: Dec. 16, 2008

(87) PCT Pub. No.: WO2008/108288
PCT Pub. Date: Sep. 12, 2008

(65) Prior Publication Data
US 2009/0135985 A1  May 28, 2009

(30) Foreign Application Priority Data
Mar. 2, 2007 (JP) .................................. 2007-053160

(51) Int. Cl.
*G21C 19/00* (2006.01)
(52) U.S. Cl. .......................... 376/260; 376/263; 376/327
(58) Field of Classification Search .................. 376/260, 376/263, 353, 327, 294
See application file for complete search history.

(56) References Cited

U.S. PATENT DOCUMENTS

| | | | | |
|---|---|---|---|---|
| 5,102,614 A | * | 4/1992 | Dixon et al. | 376/260 |
| 5,254,835 A | * | 10/1993 | Dalke et al. | 219/125.11 |
| 2007/0157730 A1 | | 7/2007 | Ochiai et al. | |

FOREIGN PATENT DOCUMENTS

| | | | |
|---|---|---|---|
| JP | 58-34394 | | 2/1983 |
| JP | 7-151895 | | 6/1995 |
| JP | 10 10282 | | 1/1998 |
| JP | 2001 255395 | | 9/2001 |
| JP | 2002 328193 | | 11/2002 |
| JP | 2005-227218 | * | 8/2005 |
| JP | 2005 227218 | | 8/2005 |
| JP | 2005 233758 | | 9/2005 |
| JP | 2006 201141 | | 8/2006 |
| JP | 2006 337175 | | 12/2006 |
| JP | 2007 17418 | | 1/2007 |
| WO | WO 02/11151 A1 | | 2/2002 |

* cited by examiner

*Primary Examiner* — Ricardo Palabrica
(74) *Attorney, Agent, or Firm* — Oblon, Spivak, McClelland, Maier & Neustadt, L.L.P.

(57) ABSTRACT

A maintenance/repair device for reactor internal structure 6 of the present invention includes a device body 6a configured to be fixed on a reactor internal structure 49. Connected to the device body 6a is a welding-part repair mechanism 6b configured to repair a welding part 49a of the reactor internal structure 49. Thus, a welding part 2a of the reactor internal structure 49 can be repaired by the welding-part repair mechanism 6b, while the device body 6a is fixed on the reactor internal structure 49.

7 Claims, 14 Drawing Sheets

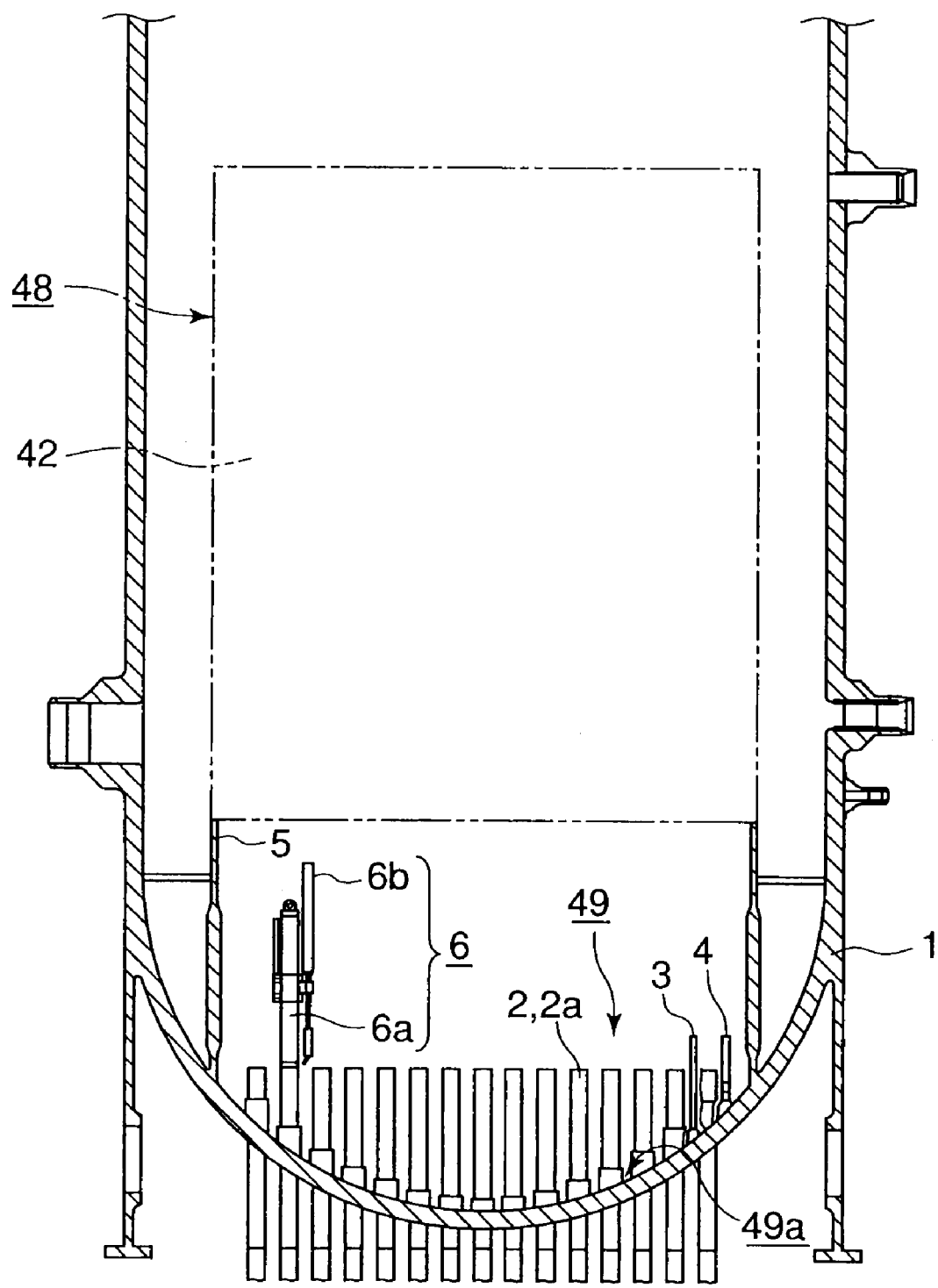
F I G. 1

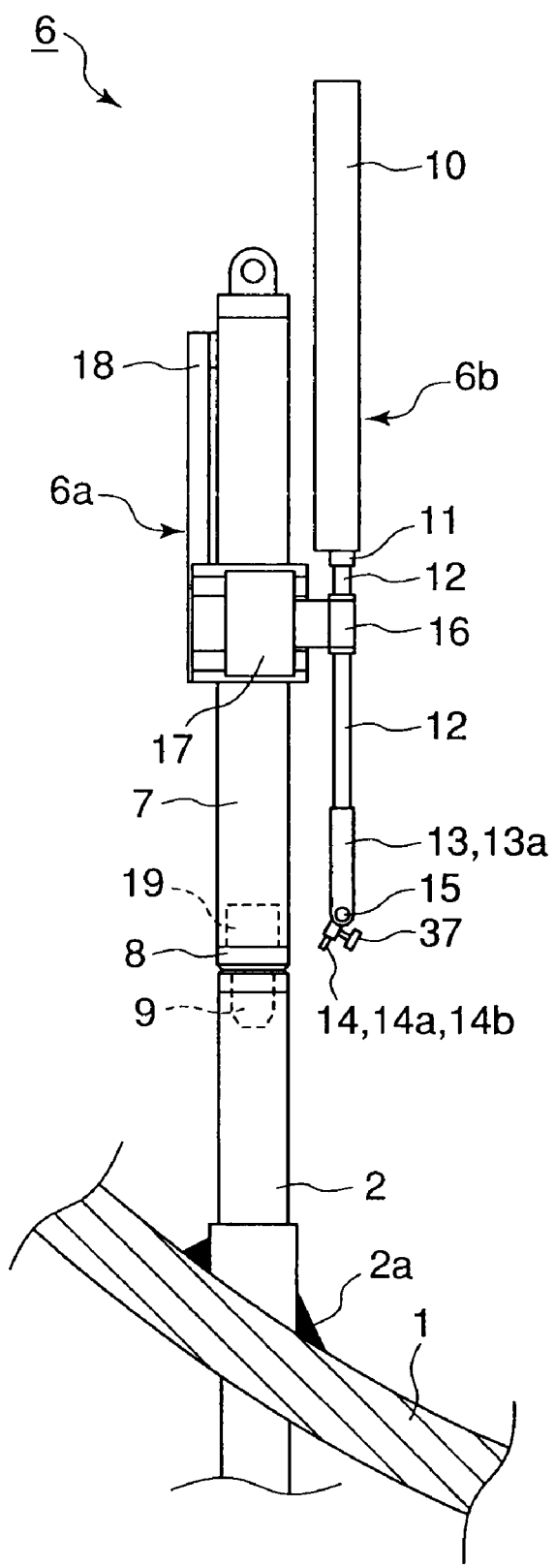
F I G . 2

BACKGROUND ART

MAINTENANCE AND REPAIR DEVICE FOR STRUCTURE INSIDE NUCLEAR REACTOR

FIELD OF THE INVENTION

The present invention relates to a maintenance/repair device for reactor internal structure, which is used for maintaining/repairing a reactor internal structure that is installed on a bottom of a reactor pressure vessel.

BACKGROUND ART

In a light water reactor, a reactor internal structure installed on a bottom of a reactor pressure vessel is generally formed of a material having an excellent corrosion resistance and a high-temperature strength, such as an austenitic stainless steel and a high nickel alloy. However, even a reactor internal structure formed of such a material may suffer from a material deterioration which is caused by a lengthy operation under a high temperature and a high pressure and by an irradiation of neutron. In particular, in a portion near a welding part of a reactor internal structure, a material thereof may be liable to cause a crack or a tensile residual stress may be generated, because of a heat generated upon welding. In this case, there is a possibility that a stress corrosion cracking occurs.

Laser peening is known as one of maintenance techniques for preventing the stress corrosion cracking, and various methods thereof have been developed. In the laser peening, a pulse laser is irradiated onto a material to generate a plasma on a surface of the material, and a kinetic energy of an impulse wave of the plasma is utilized to change a tensile residual stress on the material surface into a compressive stress. Thus, there is eliminated a stress factor (tensile residual stress caused by welding), which is one of three factors inviting the stress corrosion cracking, i.e., a material factor, an environmental factor, and the stress factor. Accordingly, the stress corrosion cracking in a portion near a welding part can be prevented.

For example, JP2002-328193A (see, Patent Document 1), JP2001-255395A (see, Patent Document 2), and JP2005-227218A (see, Patent Document 3) respectively propose an apparatus that subjects a reactor internal structure to a laser peening process (laser peening apparatus), with a view to preventing the stress corrosion cracking. This kind of laser peening apparatus has a vertically longer length and a large mass. In order to subject a reactor internal structure to a laser peening process during a maintenance/repair operation of the reactor internal structure, it is necessary to precisely arrange a laser peening apparatus in position, and to stably fix the same. To this end, a lower part of the laser peening apparatus has to be fixed on the reactor internal structure, such as a control-rod drive mechanism housing or an in-core instrumentation cylinder, which is installed on a bottom of a reactor pressure vessel, while an upper part of the laser peening apparatus has to be held by a reactor internal support, such as an upper lattice plate or a core support plate, which is disposed on an upper part of the reactor pressure vessel (see, FIG. 17).

However, when the reactor internal structure such as the upper lattice plate or the core support plate is not disposed, for example, during a work in which the reactor internal support is replaced, the upper part of the laser peening apparatus cannot be held. In this case, it is difficult to stably fix the laser peening apparatus inside the reactor pressure vessel. Therefore, when the reactor internal support is not disposed, it is impossible to maintain/repair the reactor internal structure by using the laser peening apparatus.

DISCLOSURE OF THE INVENTION

The present invention has been made in view of the above circumstances. An object of the present invention is to provide a maintenance/repair device for reactor internal structure, which is capable of, even when a reactor internal support is not disposed, maintaining/repairing a reactor internal structure installed on a bottom of a reactor pressure vessel, by fixing a laser peening apparatus on the reactor internal structure without the laser peening apparatus being held by the reactor internal support.

Another object of the present invention is to provide a maintenance/repair device for reactor internal structure, which is capable of, when a reactor internal support is disposed, maintaining/repairing a reactor internal structure installed on a bottom of a reactor pressure vessel, by smoothly guiding a laser peening apparatus to the reactor internal structure and fixing the laser peening apparatus thereon.

The present invention is a maintenance/repair device for reactor internal structure that is used, when a reactor internal support is not disposed, for maintaining/repairing a reactor internal structure installed on a bottom of a reactor pressure vessel, the maintenance/repair device for reactor internal structure comprising: a device body configured to be fixed on the reactor internal structure; and a welding-part repair mechanism connected to the device body, the welding-part repair mechanism being configured to repair a welding part of the reactor internal structure; wherein a welding part of the reactor internal structure is repaired by the welding-part repair mechanism, while the device body is fixed on the reactor internal structure.

The present invention is the maintenance/repair device for reactor internal structure, wherein: the reactor internal structure is formed of a control-rod drive mechanism housing; and the device body has: a frame to which the welding-part repair mechanism is connected; a guide connected to the frame, the guide being configured to be fitted in the control-rod drive mechanism housing; and a clamp mechanism disposed in the guide, the clamp mechanism being configured to fix the device body on the control-rod drive mechanism housing.

The present invention is the maintenance/repair device for reactor internal structure, wherein: the reactor internal structure is formed of an in-core instrumentation cylinder; and the device body has: a frame to which the welding-part repair mechanism is connected; a guide connected to the frame, the guide being configured to be fitted to the in-core instrumentation cylinder; and a grip mechanism disposed in the guide, the grip mechanism being configured to fix the device body on the in-core instrumentation cylinder.

The present invention is the maintenance/repair device for reactor internal structure, wherein the device body has an elevation mechanism connected to the welding-part repair mechanism, the elevation mechanism being capable of moving in an up and down direction with respect to the frame.

The present invention is the maintenance/repair device for reactor internal structure, wherein an outer circumference of the frame of the device body and an outer circumference of the control-rod drive mechanism housing have substantially the same diameters, whereby the welding-part repair mechanism can be continuously moved, along the outer circumference of the frame and the outer circumference of the control-rod drive mechanism housing, with respect to the device body in the up and down direction, by the elevation mechanism.

The present invention is the maintenance/repair device for reactor internal structure, wherein the welding-part repair mechanism has: a laser transmitter configured to send a pulse laser beam; an irradiation lens attachment body connected to the laser transmitter through a light guide cylinder and an irradiation head; and an irradiation lens disposed in the irradiation lens attachment body, the irradiation lens being configured to irradiate a pulse laser beam from the laser transmitter onto a welding part of the reactor internal structure so as to eliminate a residual stress of the welding part.

The present invention is the maintenance/repair device for reactor internal structure, wherein the irradiation lens attachment body is provided with an underwater camera for confirming a position and a direction of the irradiation lens.

The present invention is the maintenance/repair device for reactor internal structure, wherein the irradiation lens attachment body is provided with an apparatus configured to detect an ultrasonic wave that is generated from the welding part, when a pulse laser beam is irradiated from the irradiation lens onto the welding part.

The present invention is a maintenance/repair device for reactor internal structure that is used, when there is disposed a reactor internal support including a shroud, an upper lattice plate positioned above the shroud, and a core support plate positioned below the shroud, for maintaining/repairing a reactor internal structure installed on a bottom of a reactor pressure vessel, the maintenance/repair device for reactor internal structure comprising: a device body configured to be fixed on the reactor internal structure; and a welding-part repair mechanism connected to the device body, the welding-part repair mechanism being configured to repair a welding part of the reactor internal structure; wherein: a cylindrical guide pipe is disposed between the upper lattice plate and the core support plate; and the device body and the welding-part repair mechanism are passed downward from above through the guide pipe, and the welding part of the reactor internal structure is repaired by the welding-part repair mechanism, while the device body is fixed on the reactor internal structure.

According to the present invention, even when the reactor internal support is not disposed, the device body of the maintenance/repair device for reactor internal structure can be stably fixed on the reactor internal structure installed on the bottom of the reactor pressure vessel, without an upper part of the maintenance/repair device for reactor internal structure being held by the reactor internal support. Thus, the welding part of the reactor internal structure can be repaired by the welding-part repair mechanism of the maintenance/repair device for reactor internal structure.

In addition, when the reactor internal support is disposed, the maintenance/repair device for reactor internal structure can be smoothly guided to the reactor internal structure installed on the bottom of the reactor pressure vessel and can be fixed on the reactor internal structure. Thus, the welding part of the reactor internal structure can be repaired by the welding-part repair mechanism of the maintenance/repair device for reactor internal structure.

BRIEF DESCRIPTION OF THE DRAWINGS

FIG. 1 is an overall schematic view showing an attachment state of a maintenance/repair device for reactor internal structure to a reactor pressure vessel of a boiling water reactor (BWR) in a first embodiment of the present invention.

FIG. 2 is a structural view showing a detailed structure of the maintenance/repair device for reactor internal structure in the first embodiment of the present invention.

BEST MODE FOR CARRYING OUT THE INVENTION

First Embodiment

Figure 3:
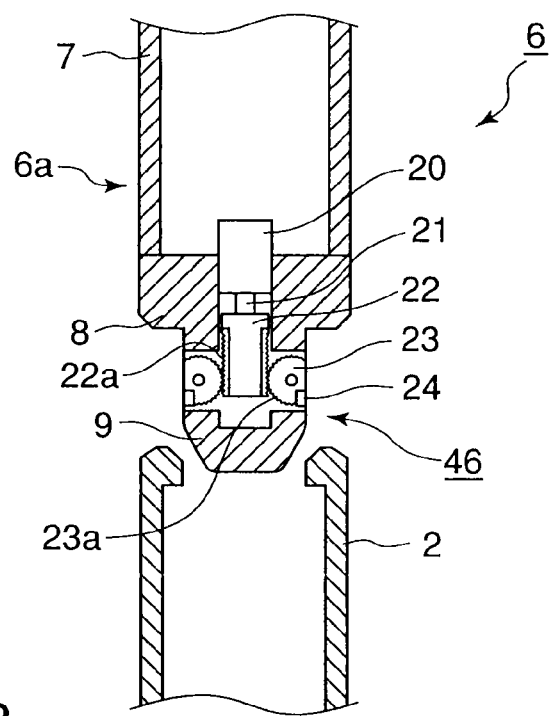
FIG. 3 is a sectional view showing a structure of an upper part of a control-rod drive mechanism housing and a structure of a lower part of the maintenance/repair device for reactor internal structure in the first embodiment of the present invention.
Figure 4:
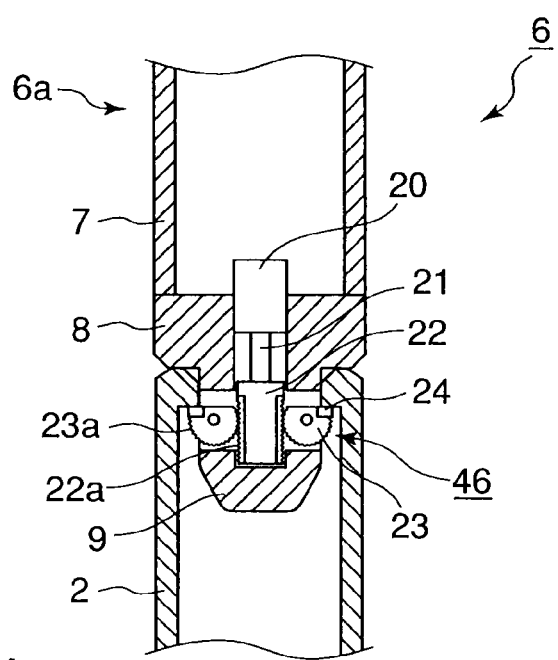
FIG. 4 is a sectional view showing the structure of the upper part of the control-rod drive mechanism housing and the structure of the lower part of the maintenance/repair device for reactor internal structure in the first embodiment of the present invention.
Figure 7:
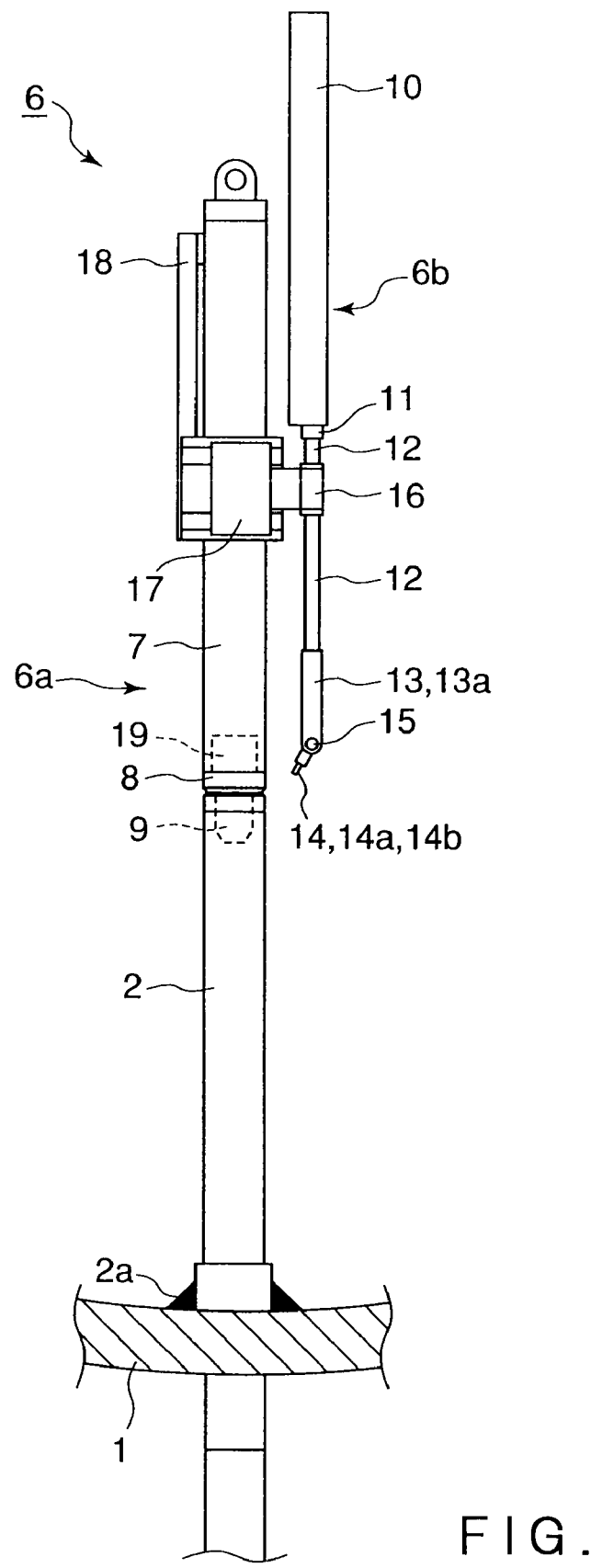
FIG. 7 is structural view showing an elevating operation of an elevation mechanism in the first embodiment of the present invention.
Figure 8:
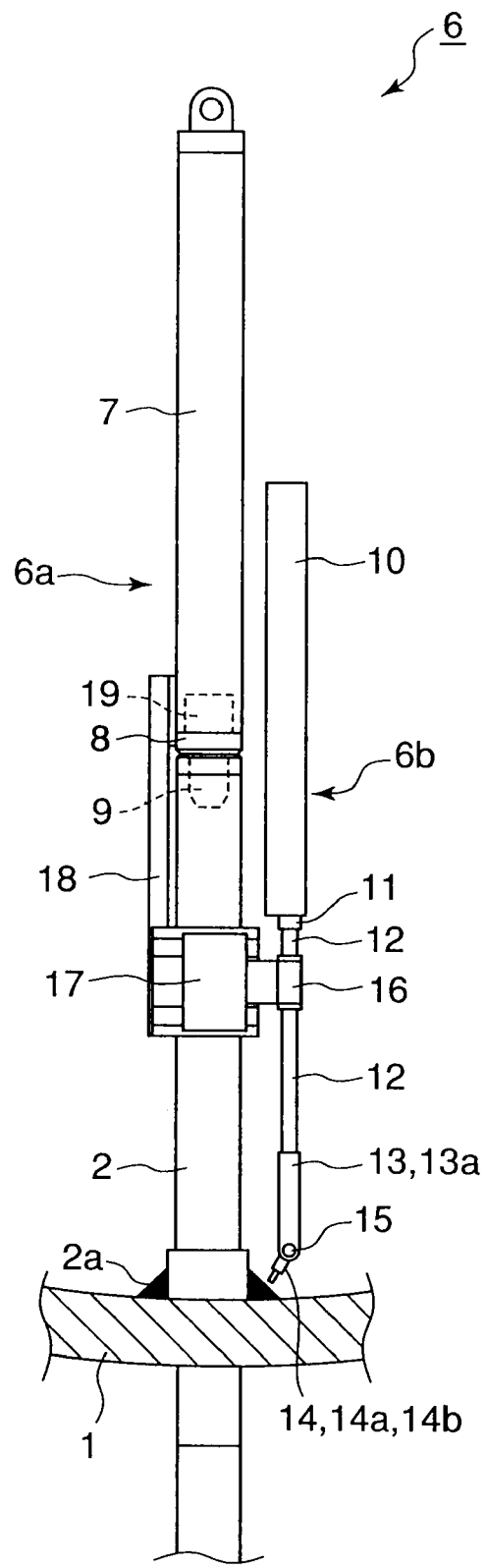
FIG. 8 is a structural view showing the elevating operation of the elevation mechanism in the first embodiment of the present invention.
Figure 13:
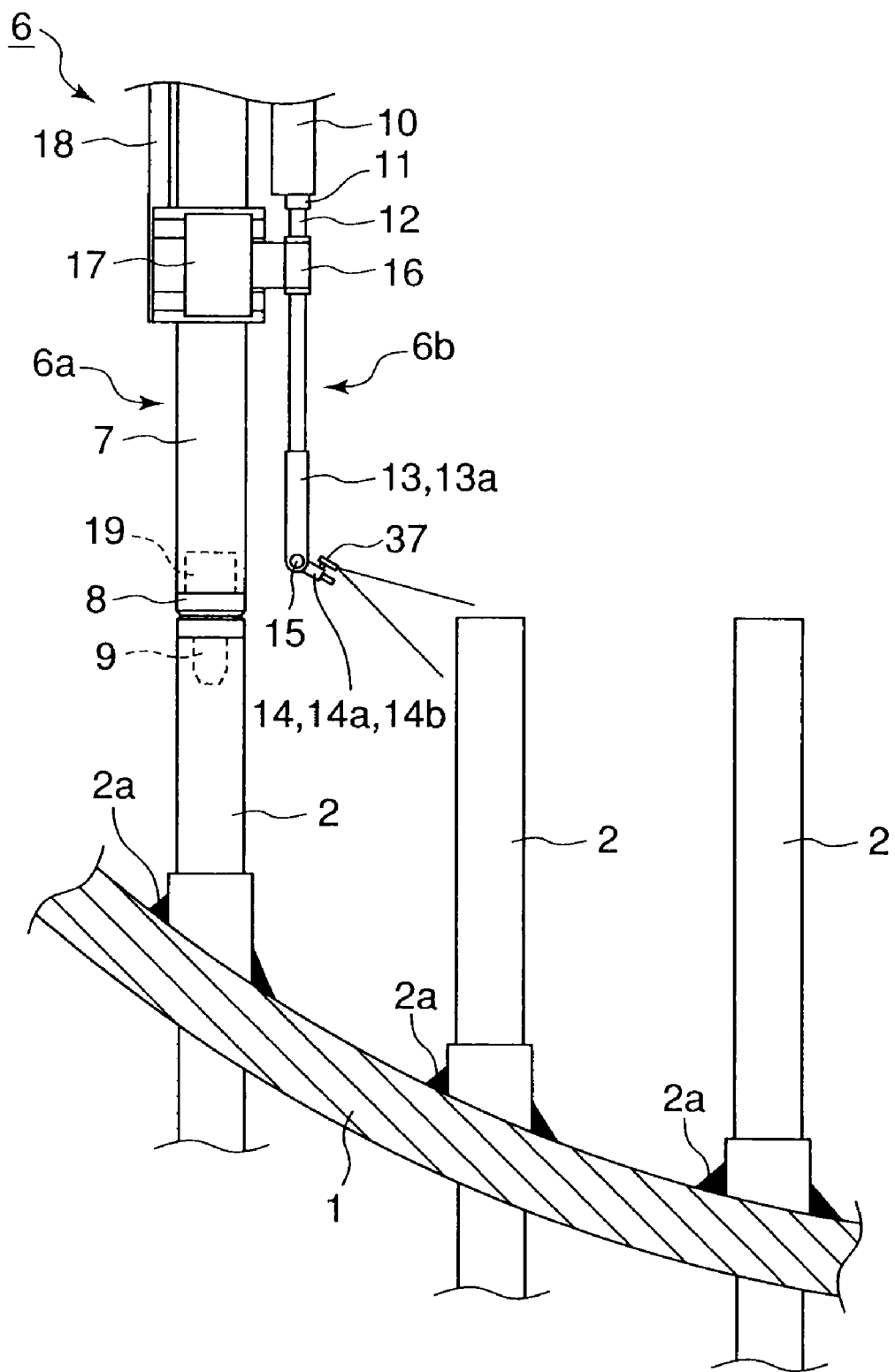
FIG. 13 is an enlarged view of an end of the maintenance/repair device for reactor internal structure in the first embodiment, showing an attachment state of an underwater camera.
Figure 14:
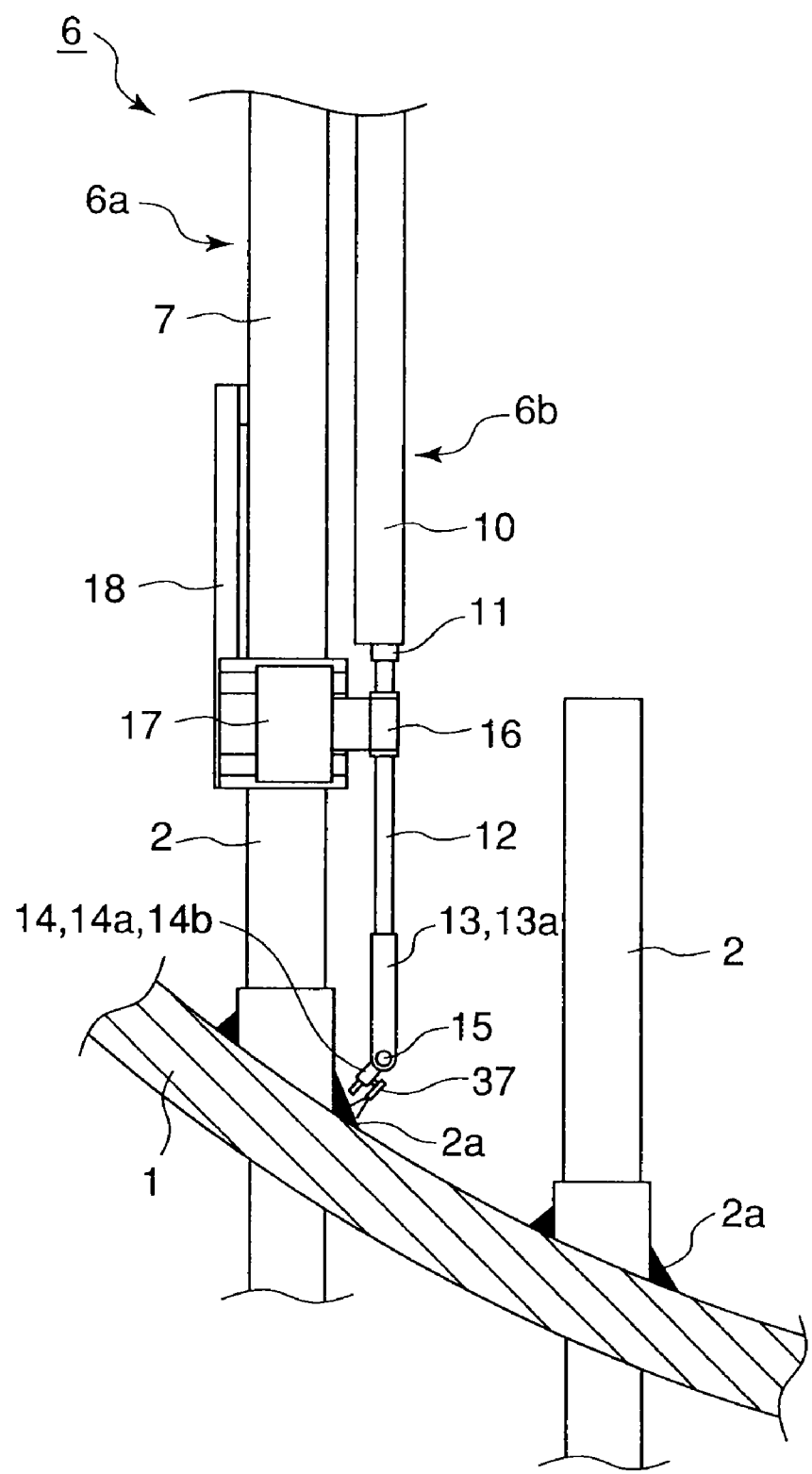
FIG. 14 is an enlarged view of the end of the maintenance/repair device for reactor internal structure in the first embodiment, showing the attachment state of the underwater camera.

Embodiments of the present invention will be described herebelow with reference to the drawings. FIGS. 1 to 4, 7, 8, 13, and 14 show a first embodiment of a maintenance/repair device for reactor internal structure of the present invention. FIG. 1 is an overall schematic view showing an attachment state of the maintenance/repair device for reactor internal structure to a reactor pressure vessel of a boiling water reactor (BWR). FIG. 2 is a structural view showing a detailed structure of the maintenance/repair device for reactor internal structure. FIGS. 3 and 4 are sectional views showing a structure of an upper part of a control-rod drive mechanism housing and a structure of a lower part of the maintenance/repair device for reactor internal structure. FIGS. 7 and 8 are structural views showing an elevating operation of an elevation mechanism. FIGS. 13 and 14 are enlarged views of an end of the maintenance/repair device for reactor internal structure, showing an attachment state of an underwater camera.

In the first place, a maintenance/repair device for reactor internal structure 6 in the first embodiment is described with reference to FIG. 1. The maintenance/repair device for reactor internal structure 6 in this embodiment is a device which is used, when a reactor internal support 48 is not disposed, for maintaining/repairing, e.g., laser-peening, a welding part 49a of a reactor internal structure 49 (hereinafter, reactor internal structure welding part 49a), such as a welding part 2a of a control-rod drive mechanism housing 2 (hereinafter control-rod drive mechanism housing welding part 2a), which is installed on a bottom of a reactor pressure vessel 1 in a boiling water reactor (BWR).

Figure 17:
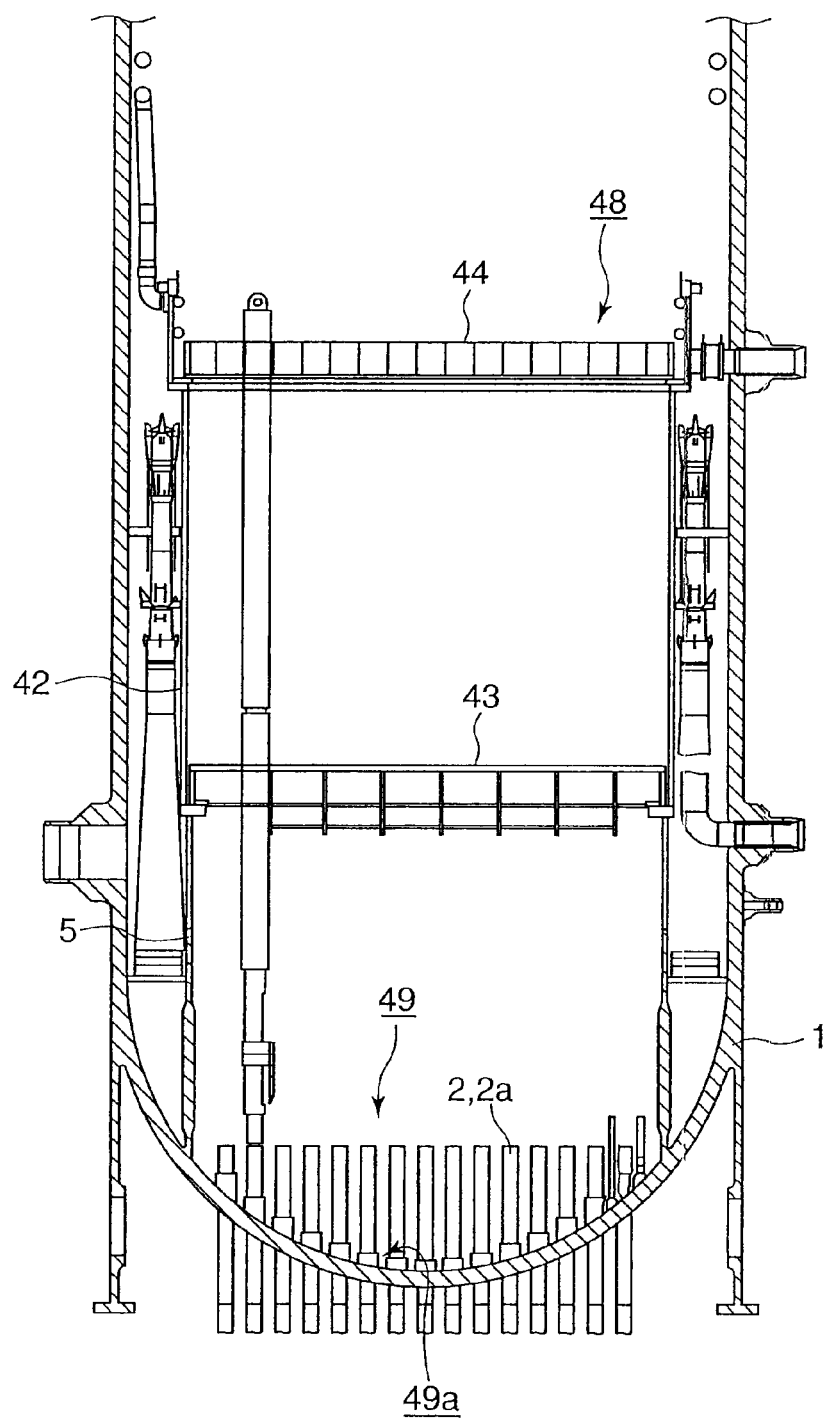
FIG. 17 is an overall schematic view showing an attachment state of a conventional maintenance/repair device for reactor internal structure to a reactor pressure vessel.

An inner structure of the reactor pressure vessel 1 of the boiling water reactor (BWR) is described with reference to FIG. 1. Inside the reactor pressure vessel 1, there are disposed: the control-rod drive mechanism housing 2 welded to the bottom of the reactor pressure vessel 1; a neutron instrumentation tube 3 similarly welded to the bottom of the reactor pressure vessel 1; a core support plate differential pressure detection pipe 4 welded to the bottom of the reactor pressure vessel 1; and a shroud support ring 5 welded to the bottom of the reactor pressure vessel 1. The shroud support ring 5 is adapted to support a reactor internal support 48 including a shroud 42, an upper lattice plate positioned above the shroud 42, and a core support plate 43 positioned below the shroud 42 (see, FIG. 17). The aforementioned reactor internal support 48 is generally located on an upper side of the shroud support ring 5. However, in this embodiment, there is described the maintenance/repair device for reactor internal structure 6 which is used when the reactor internal support 48 is not disposed, e.g., during a work in which the reactor internal support 48 is replaced.

As shown in FIGS. 1 to 4, the maintenance/repair device for reactor internal structure 6 includes: a device body 6a configured to be fixed on the control-rod drive mechanism housing 2; and a welding-part repair mechanism 6b connected to the device body 6a, the welding-part repair mechanism 6b being configured to repair the control-rod drive mechanism welding part 2a.

As shown in FIGS. 2 to 4, the device body 6a has: a cylindrical frame 7 to which the welding-part repair mechanism 6b is connected; a seat base 8 disposed on a lower end of the frame 7; a guide 9 connected to the seat base 8, the guide 9 being configured to be fitted in the control-rode drive mechanism housing 2; and a clamp mechanism 46 disposed in the guide 9, the clamp mechanism 46 being configured to fix the device body 6a on the control-rod drive mechanism housing 2. The frame 7 of the device body 6a is provided with cutouts in a side surface thereof in which various components can be attached/accommodated.

Next, the clamp mechanism 46 incorporated in the guide 9 is described with reference to FIGS. 3 and 4. The clamp mechanism 46 has an air cylinder 20 disposed on an upper central portion of the seat base 8, a rod 21 connected to the air cylinder 20, and a rack 22 connected to an end of the rod 21. Rotatably disposed on the guide 9 are a plurality of pinions 23 each having a shape in which a part of an arc is linearly cut off. A pad 24 is disposed on an end portion of an arcuate portion of each of the pinions 23. The rack 22 has gears 22a on a side surface thereof, and the pinion 23 has gears 23a on the arcuate portion. The gears 22a of the rack 22 and the gears 23a of the pinion 23 are engaged with each other. By a movement of the air cylinder 20 in an up and down direction, the rack 22 is moved through the rod 21 in the up and down direction, so as to rotate the pinions 23 having the gears 23a engaged with the gears 22a on the side surface of the rack 22.

As shown in FIG. 2, the frame 7 of the device body 6a is connected to the welding-part repair mechanism 6b via a rotation mechanism 16 that makes rotatable the welding-part repair mechanism 6b with respect to a central axis of a laser transmitter 10. Connected to the frame 7 of the device body 6a is an extension mechanism 17 that makes horizontally movable the welding-part repair mechanism 6b and the rotation mechanism 16 with respect to the frame 7. In addition, disposed on the frame 7 is an elevation mechanism 18 that makes vertically movable the welding-part repair mechanism 6b, the rotation mechanism 16, and the extension mechanism 17 with respect to the frame 7. Disposed in the frame 7 is a turn mechanism 19 that makes rotatable the frame 7 with respect to a central axis of the control-rod drive mechanism housing 2.

Next, an inner structure of the elevation mechanism 18 is described in detail below with reference to FIGS. 7 and 8. The extension mechanism 17 has an inner diameter corresponding to an outer diameter of an outer circumference of the frame 7. The frame 7 is inserted to an inside of the extension mechanism 17. Thus, the extension mechanism 17 can be vertically moved along the frame 7 with respect to the frame 7. The outer circumference of the frame 7 and an outer circumference of the control-rod drive mechanism housing 2 have substantially the same outer diameters.

Next, an attachment state an underwater camera 37 is described with reference to FIGS. 2, 13, and 14. Attached to an irradiation lens attachment body 14 is the underwater camera 37 for confirming a position and a direction of an irradiation lens 14a.

Next, the welding-part repair mechanism 6b is further described with reference to FIG. 2. The welding-part repair mechanism 6b has the laser transmitter 10 configured to send a pulse laser beam, a light guide cylinder 12 connected to the laser transmitter 10 via an outgoing opening 11 formed in an outgoing side of the laser transmitter 10, and an irradiation head 13 connected to an end of the light guide cylinder 12. Connected to an end of the irradiation head 13 is the irradiation lens attachment body 14 in which the irradiation lens 14a is disposed. The irradiation lens attachment body 14 can be swung with respect to the irradiation head 13 by a swing mechanism 15. Inside the irradiation head 13, there is disposed a mirror 13a that conforms an irradiation direction of a pulse laser beam emitted from the laser transmitter 10 to a swinging movement of the irradiation lens attachment body 14 by the swing mechanism 15. The irradiation lens 14a disposed in the irradiation lens attachment body 14 is formed of a condenser lens 14b for condensing a pulse laser beam emitted from the laser transmitter 10.

Next, an operation of this embodiment as structured above is described.

A procedure for the fixing maintenance/repair device for reactor internal structure 6 on the control-rod drive mechanism housing 2 is described in the first place.

At first, the maintenance/repair device for reactor internal structure 6 is lowered from above into the reactor pressure vessel 1 such that the maintenance/repair device for reactor internal structure 6 is positioned above the control-rod drive mechanism housing 2. Then, as shown in FIG. 3, the guide 9 disposed on the end of the device body 6a of the maintenance/repair device for reactor internal structure 6 is inserted into a through-hole of the control-rod drive mechanism housing 2. In this case, by moving the air cylinder 20 upward, the rack 22 is moved upward through the rod 21, so that the pinions 23 having the gears 23a engaged with the gears 22a on the side surface of the rack 22 are rotated in a direction in which the pads 24 are received in the guide 9. Thus, the pads 24 disposed on the pinions 23 can be smoothly received into the guide 9. Accordingly, without contact between the pads 24 disposed on the pinions 23 and the control-rod drive mechanism housing 2, the guide 9 can be guided to the inside of the control-rod drive mechanism housing 2, and the device body 6a can be inserted thereinto until the seat base 8 of the device body 6a is seated on the upper surface of the control-rod drive mechanism housing 2.

Then, as shown in FIG. 4, after the maintenance/repair device for reactor internal structure 6 has been seated on the control-rod drive mechanism housing 2, the air cylinder 20 is moved downward. Then, the rack 22 is moved downward through the rod 21, so that the pinions 23 having the gears 23a engaged with the gears 22a on the side surface of the rack 22 are rotated in a direction in which the pads 24 project outward the guide 9. Thus, the pads 24 disposed on the pinions 23 project outward the guide 9. Accordingly, the pads 24 disposed on the pinions 23 are pressed onto the inner surface of the control-rod drive mechanism housing 2, whereby the maintenance/repair device for reactor internal structure 6 can be securely fixed on the control-rod drive mechanism housing 2.

Next, there is described a procedure for moving the irradiation lens 14a disposed on the end of the welding-part repair mechanism 6b to a precise position and a precise direction with respect to the control-rod drive mechanism housing welding part 2a.

As described above (FIG. 2), the frame 7 of the device body 6a is connected to the welding-part repair mechanism 6b through the rotation mechanism 16, the extension mechanism 17, and the elevation mechanism 18. The turn mechanism 19 is disposed in the frame 7. The welding-part repair mechanism 6b has the swing mechanism 15. In FIG. 2, the welding-part repair mechanism 6b is rotated about the frame 7 by the turn mechanism 19, and the welding-part repair mechanism 6b is radially moved about the frame 7 by the extension mechanism 17. Thus, the irradiation lens 14a of the welding-part repair mechanism 6b can be brought to a predetermined position about the frame 7. Then, the extension mechanism 17 is moved along the frame 7 in the up and down direction by the elevation mechanism 18. Thus, the irradiation lens 14a of the welding-part repair mechanism 6b can be brought to a position near the control-rod drive mechanism housing welding part 2a with a high precision.

Figure 9:
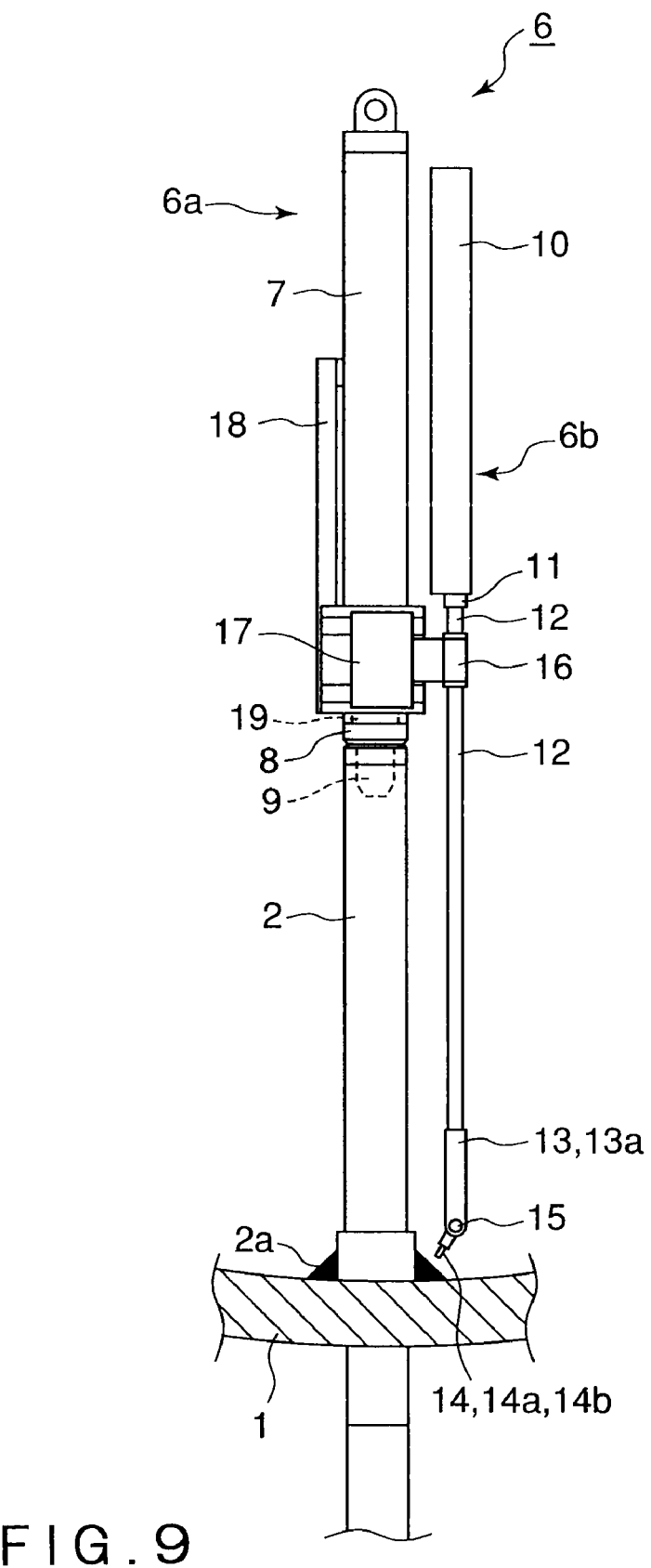
FIG. 9 is a structural view showing the elevating operation of the elevation mechanism in the first embodiment of the present invention.

Under a condition in which a distance between the upper surface of the control-rod drive mechanism housing 2 and the control-rod drive mechanism housing welding part 2a is about 1300 mm, there is a possibility that, when the outer diameter of the outer circumference of the control-rod drive mechanism housing 2 is larger than the outer diameter of the outer circumference of the frame 7, the extension mechanism 17 is caught by the upper end of the control-rod drive mechanism housing 2 and cannot be further moved downward, whereby the irradiation lens 14a cannot be moved to a position near the control-rod drive mechanism housing welding part 2a. In order to cope with this situation, the light guide cylinder 12 connected to the laser transmitter 10 has to be elongated (see, FIG. 9). However, when the light guide cylinder 12 is elongated, the setting condition of the irradiation head 13 connected to the end of the light guide cylinder 12 may become unstable, and thus a laser peening process cannot be precisely performed by the maintenance/repair device for reactor internal structure 6.

On the other hand, according to the this embodiment, since the outer circumference of the frame 7 and the outer circumference of the control-rod drive mechanism housing 2 have substantially the same outer diameters, the extension mechanism 17, which has been lowered to the lower end of the frame 7 by the elevation mechanism 18, can be further continuously lowered along the outer circumference of the control-rod drive mechanism housing 2. Namely, without elongating the light guide cylinder 12 connected to the laser transmitter 10, the irradiation lens 14a can be reliably moved to a position near the control-rod drive mechanism housing welding part 2a. Owing to the stable setting condition of the irradiation head 13, a laser peening process can be precisely performed.

Thereafter, with the use of the underwater camera 37 attached to the irradiation lens attachment body 14, a position and a direction of the irradiation lens 14a are confirmed. Based thereon, the position and the direction of the irradiation lens 14a can be adjusted to a precise position and a precise direction with respect to the control-rod drive mechanism housing welding part 2a.

Since the bottom of the reactor pressure vessel 1 has an arcuate shape, the control-rod drive mechanism housing welding part 2a has a non-symmetric shape with respect to the central axis of the control-rod drive mechanism housing 2. Thus, in order to precisely perform a laser peening process, it is necessary to grasp a precise position and a precise direction of the maintenance/repair device for reactor internal structure 6 with respect to the control-rod drive mechanism housing welding part 2a. In a general case, in the reactor pressure vessel 1, there is disposed a pin near a through-hole of the core support plate 43 positioned below the shroud 42. In this case, a precise position and a precise direction of the maintenance/repair device for reactor internal structure 6 can be detected by using this pin. However, in this embodiment, there is supposed a case in which a laser peening process is performed without the reactor internal support 48 being disposed, e.g., during a work in which the reactor internal support 48 is replaced. Thus, there may exist no structure, such as the pin, near the through-hole of the core support plate 43, which could be used otherwise to detect a precise position and a precise direction.

On the other hand, since the plurality of control-rod drive mechanism housings 2 are regularly installed on the bottom of the reactor pressure vessel 1, relative positions and directions between the control-rod drive mechanism housings 2 are apparent. Thus, in this embodiment, by using the underwater camera 37, a precise position and a precise direction of the maintenance/repair device for reactor internal structure 6 with respect to the control-rod drive mechanism housing welding part 2a are detected.

That is to say, at first, an image taken by the underwater camera 37 has been displayed on a monitor screen, and the adjacent control-rod drive mechanism housing 2 is displayed on the monitor screen. At this time, the maintenance/repair device for reactor internal structure 6 is driven in rotation such that a center of the control-rod drive mechanism housing 2 to be laser-peened and a center of the monitor screen are conformed to each other. Alternatively, the maintenance/repair device for reactor internal structure 6 is driven in rotation such that a side end surface of the control-rod drive mechanism housing 2 is conformed to a marked position that is previously put on the monitor screen. Namely, it is possible to detect a precise position and a precise direction of the maintenance/repair device for reactor internal structure 6 by the use of the monitor screen. Accordingly, the irradiation lens 14a can be adjusted to a precise position and a precise direction with respect to the control-rod drive mechanism housing welding part 2a.

Following thereto, there is performed a laser peening process to the control-rod drive mechanism housing welding part 2a by means of the welding-part repair mechanism 6b of the maintenance/repair device for reactor internal structure 6.

At first, a pulse laser beam is emitted from the laser transmitter 10. The pulse laser beam is guided to the irradiation head 13 through the light guide cylinder 12 connected to the laser transmitter 10, and is then reflected by the mirror 13a disposed in the irradiation head 13 so as to be guided to the irradiation lens attachment body 14. Thereafter, the pulse laser beam is condensed by the condensing lens 14a disposed in the irradiation lens attachment body 14, and are irradiated to the control-rod drive mechanism housing welding part 2a. Thus, there can be eliminated a residual stress of the control-rod drive mechanism housing welding part 2a onto which the pulse laser beam has been irradiated. Accordingly, a stress corrosion cracking of the control-rod drive mechanism housing welding part 2a can be prevented.

As shown in FIG. 14, after the laser peening process, the control-rod drive mechanism housing welding part 2a is visually confirmed by using the underwater camera 37 attached to the irradiation lens attachment body 14. Namely, the control-rod drive mechanism housing welding part 2a can be visually confirmed by the same underwater camera 37 attached to the maintenance/repair device for reactor internal structure 6, i.e., it is not necessary to again bring downward another underwater camera 37 close to the control-rod drive mechanism housing welding part 2a.

As has been described above, according to this embodiment, even when the reactor internal support 48 is not disposed, the device body 6a of the maintenance/repair device for reactor internal structure 6 can be stably fixed on the control-rod drive mechanism housing 2 installed on the bottom of the reactor pressure vessel 1. In addition, since the irradiation lens 14a can be moved to a precise position and a precise direction with respect to the reactor internal structure welding part 49a, a laser peening process can be precisely performed. As a result, a stress corrosion cracking of the reactor internal structure welding part 49a can be effectively prevented.

Second Embodiment

Figure 5:
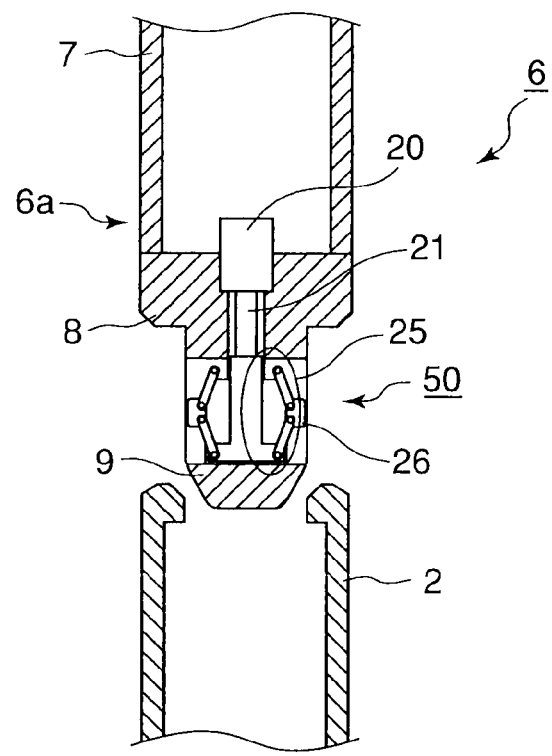
FIG. 5 is a sectional view showing a structure of an upper part of a control-rod drive mechanism housing and a structure of a lower part of a maintenance/repair device for reactor internal structure in a second embodiment of the present invention.
Figure 6:
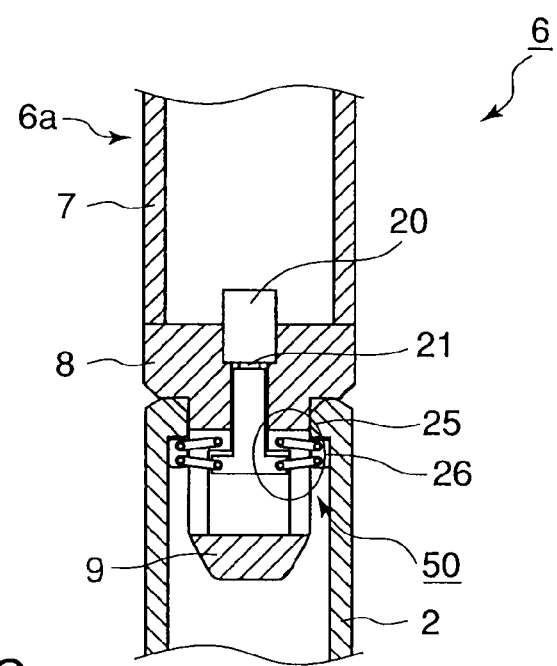
FIG. 6 is a sectional view showing the structure of the upper part of the control-rod drive mechanism housing and the structure of the lower part of the maintenance/repair device for reactor internal structure in the second embodiment of the present invention.

Next, a second embodiment of the maintenance/repair device for reactor internal structure of the present invention is described with reference to FIGS. 5 and 6. FIGS. 5 and 6 are sectional views showing a structure of an upper part of a control-rod drive mechanism housing and a structure of a lower part of the maintenance/repair device for reactor internal structure.

The second embodiment of the present invention shown in FIGS. 5 and 6 differs from the first embodiment in a structure of the clamp mechanism 46. Other structures of the second embodiment are substantially the same as those of the first embodiment shown in FIGS. 1, 2, 7, 8, 13, and 14.

In this embodiment, the same parts as those of the first embodiment shown in FIGS. 1, 2, 7, 8, 13, and 14 are shown by the same reference numbers, and a detailed description thereof is omitted. As shown in FIGS. 5 and 6, a clamp mechanism 50 has an air cylinder 20 disposed on an upper central portion of a seat base 8, a rod 21 connected to the air cylinder 20, and a plurality of pantograph mechanisms 25 connected to an end of the rod 21. A pad 26 is disposed on ends of the pantograph mechanisms 25. By a movement of the air cylinder 20 in an up and down direction, the pantograph mechanisms 25 are horizontally expanded and contracted through the rod 21.

In FIG. 5, in order to fix the maintenance/repair device for reactor internal structure 6 on a control-rod drive mechanism housing 2, a guide 9 disposed on an end of a device body 6a of the maintenance/repair device for reactor internal structure 6 is firstly inserted into a through-hole of the control-rod drive mechanism housing 2. In this case, by moving the air cylinder 20 downward, the pantograph mechanisms 25 are horizontally contracted through the rod 21, so that the pads 26 disposed on the ends of the pantograph mechanisms 25 are smoothly received into the guide 9. Accordingly, without contact between the pads 26 and the control-rod drive mechanism housing 2, the guide 9 can be guided to the inside of the control-rod drive mechanism housing 2, and the device body 6a can be inserted thereinto until a seat base 8 of the device body 6a is seated on an upper surface of the control-rod drive mechanism housing 2.

As shown in FIG. 6, after the maintenance/repair device for reactor internal structure 6 has been seated on the control-rod drive mechanism housing 2, the air cylinder 20 is moved upward. Then, the pantograph mechanisms 25 are horizontally expanded through the rod 21, so that the pads 26 disposed on the pantograph mechanisms 25 project outward the guide 9. Thus, the pads 26 disposed on the pantograph mechanisms 25 are pressed onto an inner surface of the control-rod drive mechanism housing 2. Accordingly, the maintenance/repair device for reactor internal structure 6 can be securely fixed on the control-rod drive mechanism housing 2.

Third Embodiment

Figure 10:
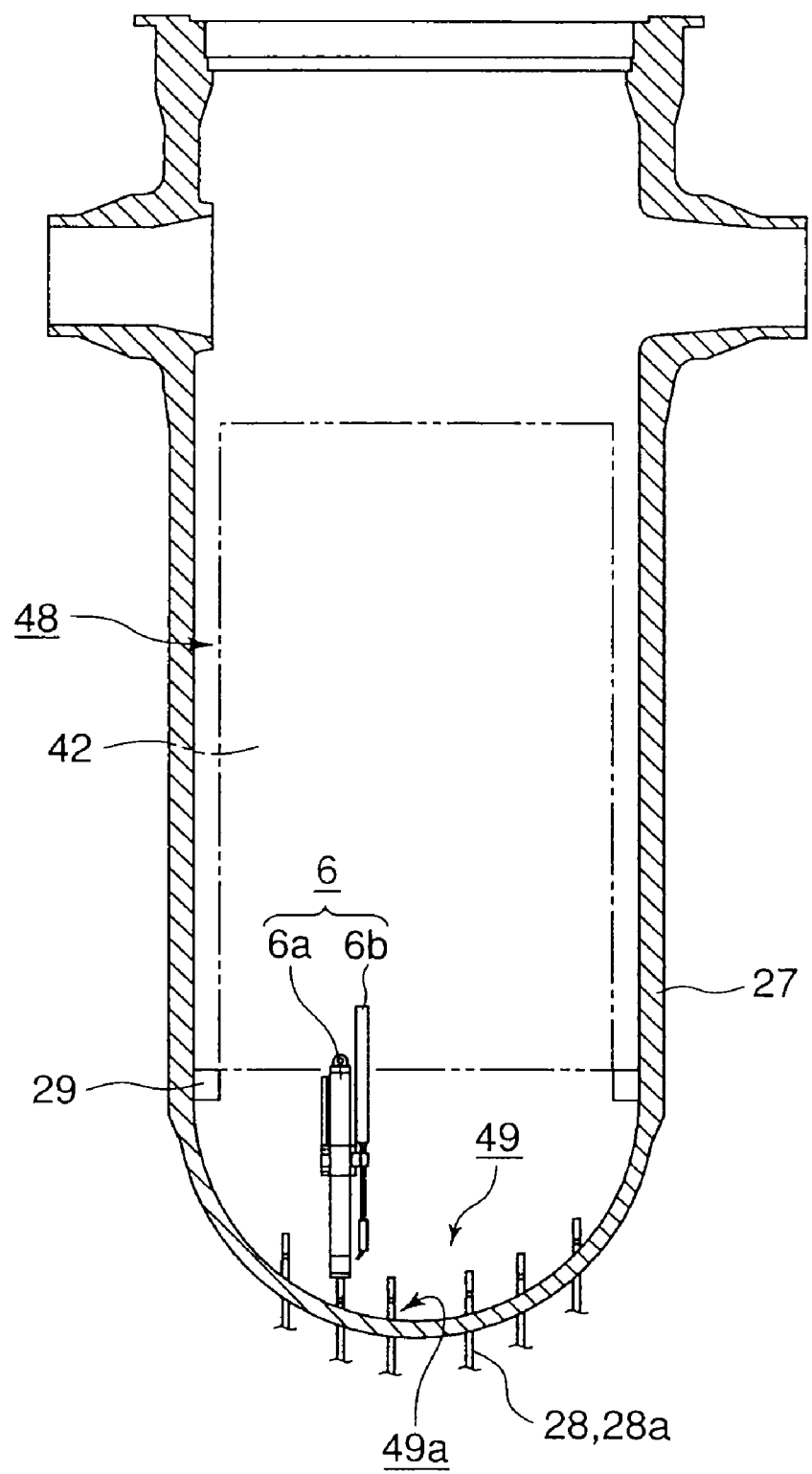
FIG. 10 is an overall schematic view showing an attachment state of a maintenance/repair device for reactor internal structure to a reactor pressure vessel of a pressurized water reactor (PWR) in a third embodiment of the present invention.
Figure 11:
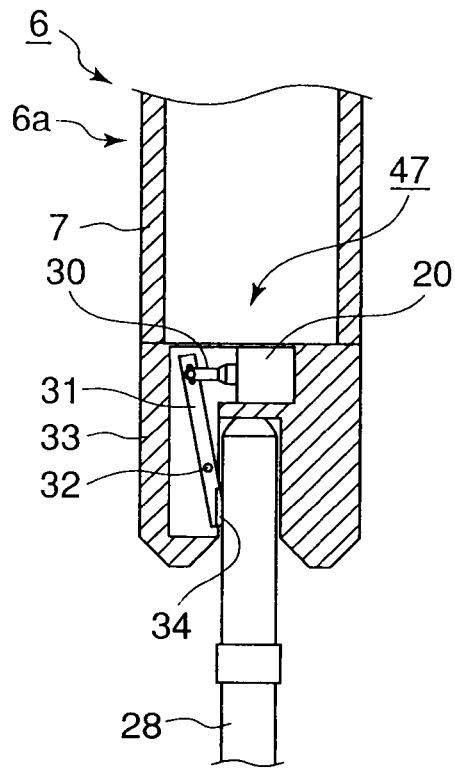
FIG. 11 is a sectional view showing a structure of an upper part of an in-core instrumentation cylinder and a structure of a lower part of the maintenance/repair device for reactor internal structure in the third embodiment of the present invention.

Next, a third embodiment of the maintenance/repair device for reactor internal structure of the present invention is described with reference to FIGS. 10 and 11. FIG. 10 is an overall schematic view showing an attachment state of the maintenance/repair device for reactor internal structure to a reactor pressure vessel of a pressurized water reactor (PWR). FIG. 11 is a sectional view showing a structure of an upper part of an in-core instrumentation cylinder and a structure of a lower part of the maintenance/repair device for reactor internal structure.

The maintenance/repair device for reactor internal structure in the third embodiment shown in FIG. 10 is a device which is used, when a reactor internal support 48 is not disposed, for maintaining/repairing, e.g., laser-peening, a reactor internal structure welding part 49a of a reactor internal structure 49, such as a welding part 28a of an in-core instrumentation cylinder 28 (hereinafter in-core instrumentation cylinder welding part 28a), which is installed on a bottom of a reactor pressure vessel 1 in a pressurized water reactor (PWR). Other structures of the third embodiment are substantially the same as those of the first embodiment shown in FIGS. 2, 7, 8, 13, and 14.

In this embodiment, the same parts as those of the first embodiment shown in FIGS. 2, 7, 8, 13, and 14 are shown by the same reference numbers, and a detailed description thereof is omitted. As shown in FIG. 10, disposed inside a reactor pressure vessel 27 are the in-core instrumentation cylinder 28 welded to a bottom of the reactor pressure vessel 27, and a core support hardware 29 welded to a side surface in the reactor pressure vessel 27. The core support hardware 29 holds a reactor internal support 48 including a shroud 42, an upper lattice plate 44 positioned above the shroud 42, and a core support plate 43 positioned below the shroud 42. Generally, the aforementioned reactor internal support 48 is located on an upper side of the core support hardware 29. However, in this embodiment, there is described the maintenance/repair device for reactor internal structure 6 which is used when the reactor internal support 48 is not disposed, e.g., during a work in which the reactor internal support 48 is replaced.

As shown in FIG. 10, the maintenance/repair device for reactor internal structure 6 includes: a device body 6a configured to be fixed on the in-core instrumentation cylinder 28; and a welding-part repair mechanism 6b connected to the device body 6a, the welding-part repair mechanism 6b being configured to repair the in-core instrumentation cylinder welding part 28a. Since an outer diameter of the in-core instrumentation cylinder 28 is smaller than an outer diameter of a control-rod drive mechanism housing 2, it is difficult to use the clamp mechanism 46 in the first embodiment and the clamp mechanism 50 in the second embodiment. Thus, a grip mechanism 47 as described below is used to fix the maintenance/repair device for reactor internal structure 6 on the in-core instrumentation cylinder 28.

As shown in FIG. 11, the device body 6a has: a cylindrical frame 7 to which the welding-part repair mechanism 6b is connected; a guide 33 connected to a lower end of the frame 7, the guide 33 being configured to be fitted to the in-core instrumentation cylinder 28; and the grip mechanism 47 disposed in the guide 33, the grip mechanism 37 being configured to fix the device body 6a on the in-core instrumentation cylinder 28.

Next, the grip mechanism 47 incorporated in the guide 33 is described with reference to FIG. 11. The grip mechanism 47 has an air cylinder 20 disposed on an upper central portion inside the guide 33, and a rod 30 connected to the air cylinder 20. A lever 31 connected to an end of the rod 30 by a pin is disposed on the guide 33 such that the lever 31 can be rotated about a pin 32. A pad 34 is disposed on an end of the lever 31. By a movement of the air cylinder 20 in a right and left direction, the lever 31 is rotated about the pin 32 through the rod 30.

In FIG. 11, in order to fix the maintenance/repair device for reactor internal structure 6 on the in-core instrumentation cylinder 28, the in-core instrumentation cylinder 28 is firstly inserted into the guide 33 disposed on the end of the device body 6a of the maintenance/repair device for reactor internal structure 6. In this case, by moving the air cylinder 20 rightward, the lever 31 is rotated through the rod 30 in a direction in which the pad 34 is received into the guide 33. Thus, the pad 34 disposed on the end of the lever 31 is smoothly received in the guide 33. Accordingly, without contact between the pad 34 disposed on the lever 31 and the in-core instrumentation cylinder 28, the in-core instrumentation cylinder 28 can be guided to the guide 33 and the in-core instrumentation cylinder 28 can be inserted thereinto until the guide 33 of the device body 6a is seated on an upper surface of the in-core instrumentation cylinder 28.

After the maintenance/repair device for reactor internal structure 6 has been seated on the in-core instrumentation cylinder 28, the air cylinder 20 is moved leftward. Then, the lever 31 is rotated through the rod 30 in a direction in which the pad 34 projects outward the guide 33. Thus, the pad 34 disposed on the end of the lever 31 is pressed onto an outer surface of the in-core instrumentation cylinder 28. Since the in-core instrumentation cylinder 28 is sandwiched between the pad 34 and the guide 33, the maintenance/repair device for reactor internal structure 6 can be securely fixed on the in-core instrumentation cylinder 28.

Fourth Embodiment

Figure 12:
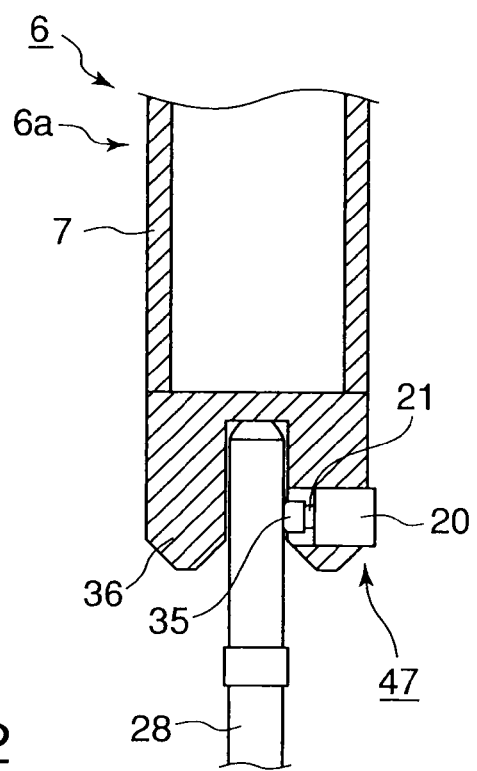
FIG. 12 is a sectional view showing a structure of an upper part of an in-core instrumentation cylinder and a structure of a lower part of a maintenance/repair device for reactor internal structure in a fourth embodiment of the present invention.

Next, a fourth embodiment of the maintenance/repair device for reactor internal structure of the present invention is described with reference to FIG. 12. FIG. 12 is a sectional view showing a structure of an upper part of an in-core instrumentation cylinder and a structure of a lower part of the maintenance/repair device for reactor internal structure.

The fourth embodiment shown in FIG. 12 differs from the third embodiment in a structure of a grip mechanism 47. Other structures of the fourth embodiment are substantially the same as those of the third embodiment shown in FIG. 10.

In this embodiment, the same parts as those of the third embodiment shown in FIG. 10 are shown by the same reference numbers, and a detailed description thereof is omitted. As shown in FIG. 12, the grip mechanism 47 has an air cylinder 20 connected to a lower side portion inside a guide 36, a rod 21 connected to the air cylinder 20, and a pad 35 disposed on an end of the rod 21. By a movement of the air cylinder 20 in a right and left direction, the rod 21 is moved in the right and left direction.

In FIG. 12, in order to fix the maintenance/repair device for reactor internal structure 6 on an in-core instrumentation cylinder 28, the in-core instrumentation cylinder 28 is firstly inserted into the guide 36 disposed on an end of a device body 6a of the maintenance/repair device for reactor internal structure 6. In this case, by moving the air cylinder 20 rightward, the pad 35 disposed on the end of the rod 21 is smoothly received into the guide 36. Accordingly, without contact between the pad 35 and the in-core instrumentation cylinder 28, the in-core instrumentation cylinder 28 can be guided to an inside of the guide 36, and the in-core instrumentation cylinder 28 can be inserted thereinto until the guide 36 of the device body 6a is seated on an upper surface of the in-core instrumentation cylinder 28.

After the maintenance/repair device for reactor internal structure 6 has been seated on the in-core instrumentation cylinder 28, the air cylinder 20 is moved leftward. Then, the pad 35 disposed on the end of the rod 21 is pressed onto an outer surface of the in-core instrumentation cylinder 28. Since the in-core instrumentation cylinder 28 is sandwiched between the pad 35 and the guide 36, the maintenance/repair device for reactor internal structure 6 can be securely fixed on the in-core instrumentation cylinder 28.

Fifth Embodiment

Figure 15:
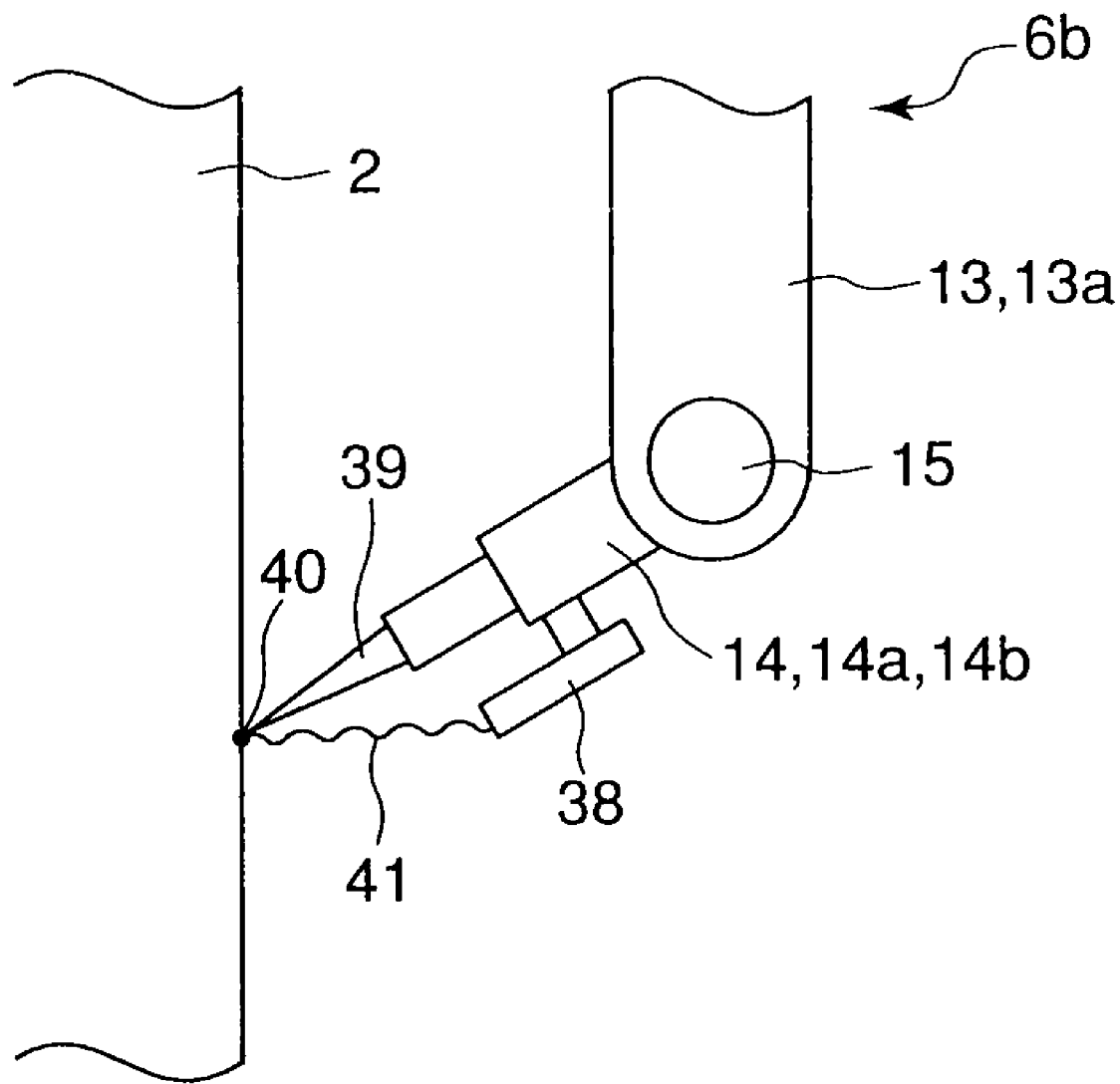
FIG. 15 is an enlarged view of an irradiation head, showing an attachment state of an ultrasonic microphone in a fifth embodiment of the present invention.

Next, a fifth embodiment of the maintenance/repair device for reactor internal structure of the present invention is described with reference to FIG. 15. FIG. 15 is an enlarged view of an irradiation head, showing an attachment state of an ultrasonic microphone.

In the fifth embodiment shown in FIG. 15, an ultrasonic microphone 38 is attached to an irradiation lens attachment body 14. Other structures of the fifth embodiment are substantially the same as those of the first embodiment shown in FIGS. 1 to 4, 7, and 8.

In this embodiment, the same parts as those of the first embodiment shown in FIGS. 1 to 4, 7, and 8 are shown by the same reference numbers, and a detailed description thereof is omitted. As shown in FIG. 15, the ultrasonic microphone 38 is attached to the irradiation lens attachment body 14. When a pulse laser beam 39 is irradiated onto a control-rod drive mechanism housing welding part 2a, the ultrasonic microphone 38 is adapted to detect an ultrasonic wave generated on the control-rod drive mechanism housing welding part 2a. In this embodiment, the pulse laser beam 39 may be irradiated onto an in-core instrumentation cylinder welding part 28a.

In FIG. 15, the pulse laser beam 39 is irradiated onto the control-rod drive mechanism housing welding part 2a, so as to generate an ultrasonic wave from an irradiation point 40 onto which the pulse laser beam 39 has been irradiated. The thus generated ultrasonic wave can be detected by the ultrasonic microphone 38. The ultrasonic wave generated from the irradiation point 40 propagate along an ultrasonic propagation channel 41 to reach the ultrasonic microphone 38. There is measured a time period from a time point when the pulse laser beam 39 has been irradiated from an irradiation lens 14a to a time point when the ultrasonic wave generated from the irradiation point 40 reaches the ultrasonic microphone 38. Since a velocity at which an ultrasonic wave travels in water at a given temperature is known, a distance from the irradiation point 40 to the ultrasonic microphone 38 can be calculated.

Generally, in order to perform a laser peening process without fail, a distance from the irradiation lens 14a to the irradiation point 40 has to be held within a certain range. Thus, it is necessary that a shape of the control-rod drive mechanism housing welding part 2a to be laser-peened is supposed based on drawing dimensions and the like, and that the pulse laser beam 39 is irradiated while moving the irradiation lens 14a along the supposed shape. However, since the control-rod drive mechanism housing 2 is welded to a reactor pressure vessel 1, there is a possibility that the shape of the actual control-rod drive mechanism housing welding part 2a considerably differs from the shape supposed based on the drawing dimensions and the like. In this case, it is difficult to hold the distance from the irradiation lens 14a to the irradiation point 40 within a certain range.

On the other hand, according to this embodiment, the pulse laser beam 39 has been previously irradiated onto a plurality of locations on the control-rod drive mechanism housing welding part 2a to be laser-peened, and a distance from the irradiation lens 14a to the irradiation point 40 is measured by the above-described method using the ultrasonic microphone 38. Based on the measurement, a difference between the supposed shape and the actual shape is calculated so as to correct the previously supposed shape, and the irradiation lens 14a is moved. Thus, it is possible to hold a distance from the irradiation lens 14a to the irradiation point 40 within a certain range.

Sixth Embodiment

Figure 16:
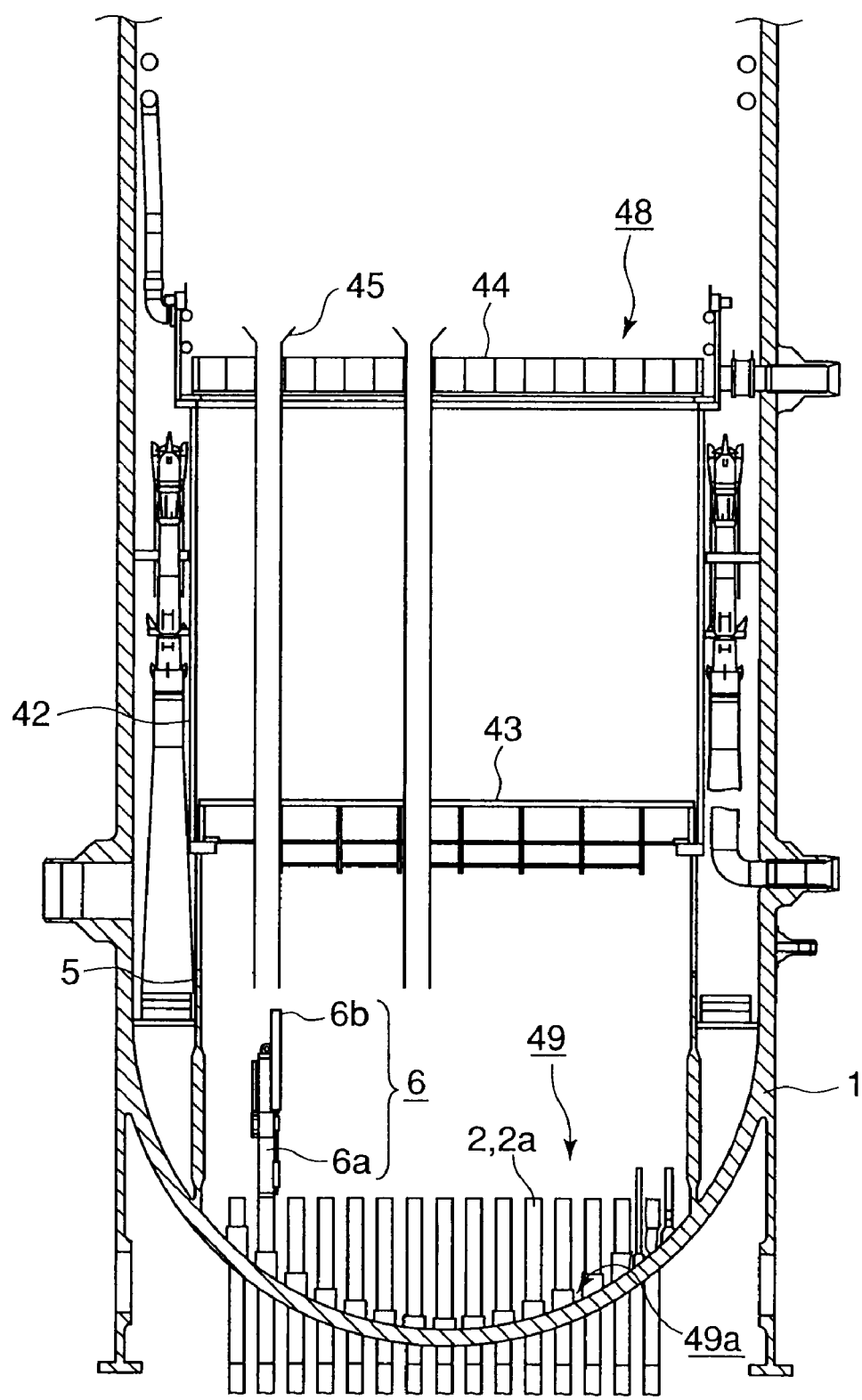
FIG. 16 is an overall schematic view showing an attachment state of a maintenance/repair device for reactor internal structure to a reactor pressure vessel in a sixth embodiment of the present invention.

Next, a sixth embodiment of the maintenance/repair device for reactor internal structure of the present invention is described with reference to FIG. 16. FIG. 16 is an overall schematic view showing an attachment state of the maintenance/repair device for reactor internal structure.

The maintenance/repair device for reactor internal structure in the sixth embodiment shown in FIG. 16 is a device which is used, when a reactor internal support 48 is disposed, for maintaining/repairing, e.g., laser-peening, a reactor internal structure welding part 49a, such as a control-rod drive mechanism housing welding part 2a. Other structures of the sixth embodiment are substantially the same as those of the first embodiment shown in FIGS. 2 to 4, 7, 8, 13, and 14.

In this embodiment, the same parts as those of the first embodiment shown in FIGS. 2 to 4, 7, 8, 13, and 14 are shown by the same reference numbers, and a detailed description thereof is omitted. As shown in FIG. 16, disposed in a reactor pressure vessel 1 is the reactor internal support 48 including a shroud 42, an upper lattice plate 44 positioned above the shroud 42, and a core support plate 43 positioned below the shroud 42. Disposed between the upper lattice plate 44 and the core support plate 43 is a cylindrical guide pipe 45. The guide pipe 45 has an outer diameter that allows passage of the guide pipe 45 through through-holes formed in the upper lattice plate 44 and the core support plate 43, and an inner diameter that allows passage of the maintenance/repair device for reactor internal structure 6 through the guide pipe 45. In addition, the guide pipe 45 has a length ranging from an upper part of the upper lattice plate 44 to an upper part of the maintenance/repair device for reactor internal structure 6 which is fixed on a control-rod drive mechanism housing 2 through the core support plate 43. In this embodiment, the maintenance/repair device for reactor internal structure 6 may be fixed on an in-core instrumentation cylinder 28.

In the aforementioned first to fifth embodiments, there is described the case in which the reactor internal support 48 is not disposed. On the other hand, in this embodiment, the rector internal support 48 is disposed in the reactor pressure vessel 1. In this case, when the maintenance/repair device for reactor internal structure 6 has a size that allows passage thereof through the through-holes formed in the upper lattice plate 44 and the core support plate 43, it is possible to pass the maintenance/repair device for reactor internal structure 6 through the reactor internal support 48 and to fix the maintenance/repair device for reactor internal structure 6 on the control-rod drive mechanism housing 2. Meanwhile, since the maintenance/repair device for reactor internal structure 6 has a rugged shape because of various components attached thereto, there is a fear that, while passing through the through-holes formed in the upper lattice plate 44 and the core support plate 43, the maintenance/repair device for reactor internal structure 6 contacts the reactor internal support 48 such as the upper lattice plate 44 and the core support plate 43. In this case, the maintenance/repair device for reactor internal structure 6 may be damaged.

In this embodiment, before the maintenance/repair device for reactor internal structure 6 is passed through the reactor internal support 48 for fixation and removal, the guide pipe 45 has been disposed on the upper lattice plate 44 and the core support plate 43. Thus, the maintenance/repair device for reactor internal structure 6 can be passed downward from above through the guide pipe 45, whereby the maintenance/repair device for reactor internal structure 6 can be prevented from being damaged by contacting the upper lattice plate 44 and the core support plate 43.

In FIG. 16, the plurality of guide pipes 45 may be previously disposed on a plurality of control-rod drive mechanism housing welding parts 2a to be laser-peened. In this case, after one control-rod drive mechanism housing welding part 2a has been subjected to a laser peening process, the maintenance/repair device for reactor internal structure 6 can be promptly moved to another control-rod drive mechanism housing welding part 2a to be laser-peened, so as to fix the maintenance/repair device for reactor internal structure 6 on a reactor internal structure 49. Therefore, a time period required for fixing the maintenance/repair device for reactor internal structure 6 on the reactor internal support 48 can be reduced.

The invention claimed is:

1. A maintenance/repair device for a reactor internal structure formed of a control-rod drive mechanism housing having a through-hole, for maintaining/repairing a reactor internal structure installed on a bottom of a reactor pressure vessel, the maintenance/repair device for reactor internal structure comprising:

a device body configured to be fixed on the reactor internal structure; and
a welding-part repair mechanism connected to the device body, the welding-part repair mechanism being configured to repair a welding part of the reactor internal structure,
wherein a welding part of the reactor internal structure is repaired by the welding-part repair mechanism, while the device body is fixed on the reactor internal structure,
the device body comprising:
a frame to which the welding-part repair mechanism is connected;
a guide connected to the frame and configured to be fitted to the through-hole in the control-rod drive mechanism housing for insertion into the through-hole; and
a clamp mechanism disposed in the guide and configured to fix the device body on the control-rod drive mechanism housing, and
wherein the clamp mechanism includes pads projecting outward of the guide so as to be pressed onto an inner surface of the control-rod drive mechanism housing when the device body is fixed on the control-rod drive mechanism housing.

2. The maintenance/repair device for reactor internal structure according to claim 1, wherein:
the reactor internal structure is formed of an in-core instrumentation cylinder; and
the device body has: a frame to which the welding-part repair mechanism is connected; a guide connected to the frame, the guide being configured to be fitted to the in-core instrumentation cylinder; and a grip mechanism disposed in the guide, the grip mechanism being configured to fix the device body on the in-core instrumentation cylinder.

3. The maintenance/repair device for reactor internal structure according to claim 1, wherein
the device body has an elevation mechanism connected to the welding-part repair mechanism, the elevation mechanism being capable of moving in an up and down direction with respect to the frame.

4. The maintenance/repair device for reactor internal structure according to claim 3, wherein
an outer circumference of the frame of the device body and an outer circumference of the control-rod drive mechanism housing have substantially the same diameters, whereby the welding-part repair mechanism can be continuously moved, along the outer circumference of the frame and the outer circumference of the control-rod drive mechanism housing, with respect to the device body in the up and down direction, by the elevation mechanism.

5. The maintenance/repair device for reactor internal structure according to claim 1, wherein
the welding-part repair mechanism has: a laser transmitter configured to send a pulse laser beam; an irradiation lens attachment body connected to the laser transmitter through a light guide cylinder and an irradiation head; and an irradiation lens disposed in the irradiation lens attachment body, the irradiation lens being configured to irradiate a pulse laser beam from the laser transmitter onto a welding part of the reactor internal structure so as to eliminate a residual stress of the welding part.

6. The maintenance/repair device for reactor internal structure according to claim 5, wherein
the irradiation lens attachment body is provided with an underwater camera for confirming a position and a direction of the irradiation lens.

7. The maintenance/repair device for reactor internal structure according to claim 5, wherein
the irradiation lens attachment body is provided with an apparatus configured to detect an ultrasonic wave that is generated from the welding part, when a pulse laser beam is irradiated from the irradiation lens onto the welding part.

* * * * *